(12) United States Patent
Seki

(10) Patent No.: US 6,622,020 B1
(45) Date of Patent: *Sep. 16, 2003

(54) SYSTEM FOR SEARCHING FOR THE LOCATION OF EACH PERSONAL HANDY PHONE IN THE PERSONAL HANDY PHONE SYSTEM

(75) Inventor: Syuichi Seki, Kawasaki (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/489,330

(22) Filed: Jun. 12, 1995

(30) Foreign Application Priority Data

Jun. 22, 1994 (JP) .............................. 6-140099

(51) Int. Cl.[7] .................................. H04Q 7/20
(52) U.S. Cl. ...................... 455/456; 455/432; 455/435; 455/561; 455/434
(58) Field of Search ................. 455/403, 422, 455/432, 433, 435, 456, 457, 550, 561, 434

(56) References Cited

U.S. PATENT DOCUMENTS

| | | | | |
|---|---|---|---|---|
| 4,852,148 A | * | 7/1989 | Shibata et al. ............... | 455/435 |
| 4,980,907 A | * | 12/1990 | Raith et al. ............. | 455/432 X |
| 5,095,531 A | * | 3/1992 | Ito .............................. | 455/435 |
| 5,212,822 A | * | 5/1993 | Fukumine et al. .......... | 455/435 |
| 5,305,466 A | * | 4/1994 | Taketsugu .................... | 455/435 |
| 5,379,447 A | * | 1/1995 | Bonta et al. ................. | 455/437 |
| 5,406,614 A | * | 4/1995 | Hara .......................... | 455/435 |
| 5,432,841 A | * | 7/1995 | Rimer ........................ | 455/457 |
| 5,502,758 A | * | 3/1996 | Tsuzuki et al. ............. | 455/457 |
| 5,535,424 A | * | 7/1996 | de Seze et al. ......... | 455/434 X |
| 5,548,816 A | * | 8/1996 | DeVaney ..................... | 455/456 |
| 5,629,975 A | * | 5/1997 | Tiedemann, Jr. et al. ... | 455/435 |
| 5,657,375 A | * | 8/1997 | Connolly et al. ........ | 455/461 X |
| 5,898,923 A | * | 4/1999 | Gaasvik et al. ......... | 455/435 X |

FOREIGN PATENT DOCUMENTS

JP 63-55825 11/1988

OTHER PUBLICATIONS

Kuwabara "Digital IDO Tsushin" by Kagaku Shinbunsha Sep. '92 (abstract annexed).
Focus "Nikkei Data Pro.Communication Sokuhouban" Nov. '93 (abstract annexed).

* cited by examiner

*Primary Examiner*—Tracy Legree
(74) *Attorney, Agent, or Firm*—Katten Muchin Zavis Rosenman (57) ABSTRACT

A location searching service system in the personal handy phone system (or PHS) is capable of searching for the location of each PHS mobile phone (such as the cordless phones used in homes) and providing the information of where the requested user of the mobile phone is located. A service system specifies the current location of the PHS mobile phone within an extremely small area denoted as a lot number in the address format of the administrative system. In the case of the mobile communication service system of the PHS, each calling area (which is about 1–2 square kms) is a gathering of a plurality of location register areas, each corresponding to the radio propagation range of a base station, being a small area having a radius of about 100 m. The location data of each mobile phone can also be registered in a common database through a PHS exchanger and this can be done for every small area having a radius of about 100 m. Every time it moves from one base station area into another, therefore, its location register information indicating the location of the base station area in which it is located, is updated and registered in the common database.

14 Claims, 11 Drawing Sheets

SYSTEM FOR SEARCHING FOR THE LOCATION OF EACH PERSONAL HANDY PHONE IN THE PERSONAL HANDY PHONE SYSTEM

BACKGROUND OF THE INVENTION

FIELD OF THE INVENTION

Mobile telephone communications by vehicular and handy phones have improved in quality and have greatly increased in number these days, as they are more and more widely used in daily life as well as for business.

Figure 1:
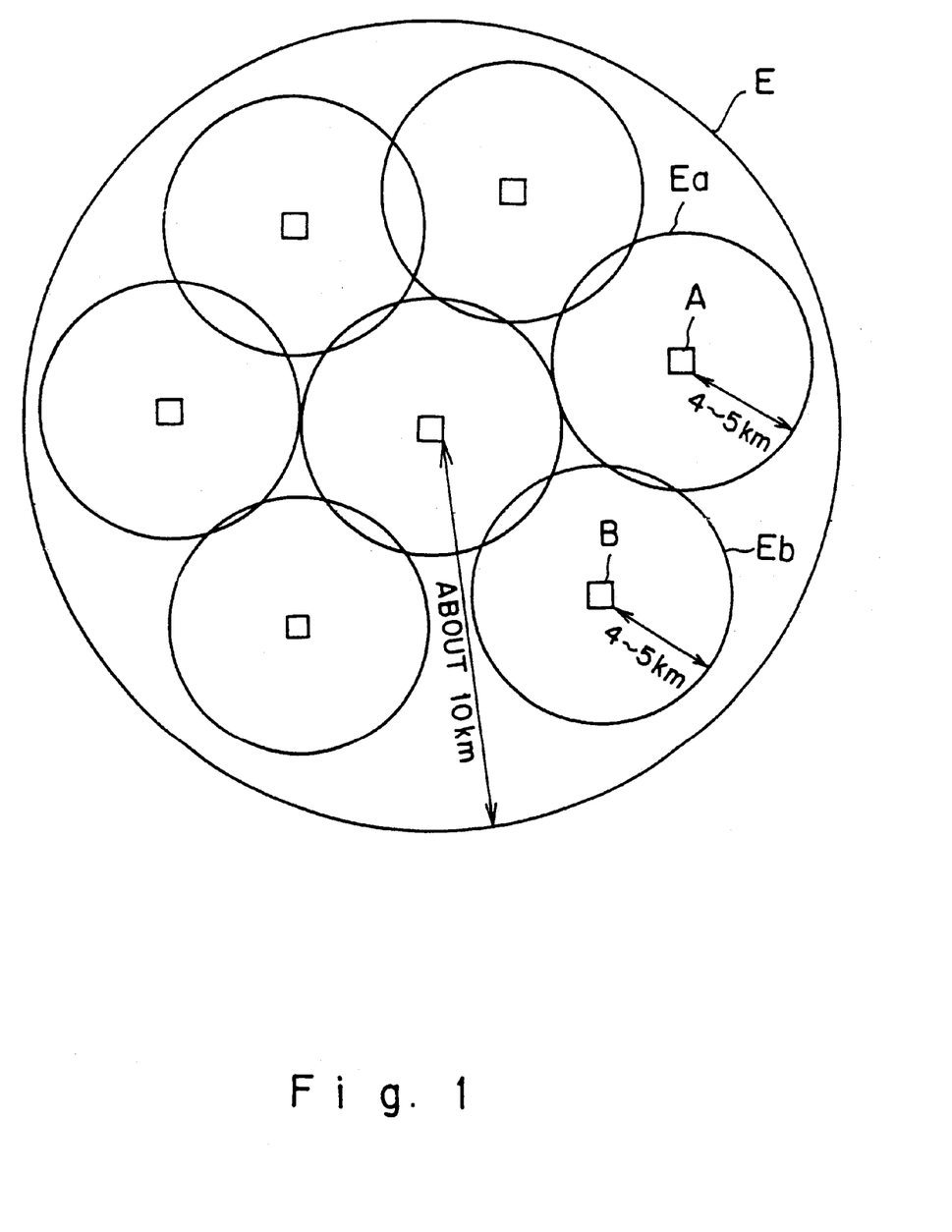
FIG. 1 shows base station areas and a calling area which comprises a plurality of these base station areas used in the conventional mobile communications by vehicular and handy phones.

These mobile telephone communications by vehicular, handy, portable or mobile phones are based on the premise that the phones are moving at all times. When the terminal machine or mobile phone is switched on, or starts its transmission, or moves from one base station to another (each base station having a function that allows radio communication to be exchanged between the mobile phone and itself), a system for enabling the current location of the mobile phone to be registered or updated in the database is employed in the communication network. In the location register system for mobile communications by vehicular and handy phones, radio-wave propagation or base station areas Ea, Eb, - - - (each having a radius of about 4–5 km and including each of the base stations A, B, - - - ) come together to form each of the large calling areas E (each having a radius of about 10 km), as shown in FIG. 1, and the location register of each phone is made in every calling area E. In short, when the mobile phone moves from one calling area to another, it transmits the information that it has moved to a new calling area, and its new location is thus updated. In the conventional mobile communications by vehicular and handy phones, therefore, the location of each mobile phone can be registered in every calling area (being quite a large area, equal to that of a prefecture in the Japanese administrative system).

Mobile communications by vehicular and handy phones can even be made when the mobile phones are moving at high speed, and the area over which communication can be made is quite large. They are therefore extremely advantageous for businesses. Their basic and communication fees, however, are still quite high so that they cannot penetrate yet into domestic and small business markets.

The personal handy phone system (PHS) has now been developed to solve this problem. The PHS results from the consideration that cordless phones now used in homes can be made usable outdoors. Communication with the PHS is not possible when its mobile phone is moving at high speed, but it is possible at low speeds, like when the phone user is walking, for example. Compared with the conventional mobile communications by vehicular and handy phones, therefore, its function has some limitations, but if its basic and communication fees could be reduced, it is expected that it could be used more widely and easily in homes and other places.

When a mobile communication system incorporating this PHS is used, it can be expected in the future that the mobile phones of the PHS will have a function which allows their locations to be registered in a far smaller area. In addition, it can also be expected that more accurate location information showing where PHS users are currently located will be obtainable in homes, and when the system has this function to accurately detect and to register locations, elderly people and young boys and girls can safely leave their homes at night for some activity, taking with them a mobile phone of this system. It can be therefore expected that this system will become extremely useful in business as well as in daily life.

However, the location searching or detecting system of the PHS has not yet been embodied. In the conventional mobile communications by vehicular and handy phones, the location of each phone can be registered. The calling area, however, in which the location register is made possible is quite large, equal to that of a prefecture in the Japanese Administrative system, so this system cannot be used, as it is, for the PHS, from the viewpoints of the location register area and the basic and communication fees. A system enabling the location of each phone to be registered in a far smaller area is therefore required for the PHS.

SUMMARY OF THE INVENTION

An object of the present invention is therefore to provide a location searching system for the PHS, having a function to allow the location of each mobile phone to be registered in a far smaller area, and to be capable of reading this location information which is registered and restricted to a smaller area, and thus passing this location information to the home, when the mobile phone user's home asks the PHS where the end user is.

According to the present invention, location data transmitted from mobile phones in every area Ea, Eb, or - - - (having a radius of about 100 m) to each of base stations A, B, - - - can be registered in a common database through a PHS exchanger.

When a mobile phone is in the area Ea of the base station A, for example, it transmits its location information in response to a signal transmitted from the base station A, the signal having a frequency characteristic of the station A, and this location information is then registered in the common database. When it moves from the area Ea of the base station A into the one Eb of the base station B, which is adjacent to the area Ea, it again transmits its location information in response to a signal transmitted from the base station B, said signal having a frequency characteristic of the station B, and this location information showing that it is now in the area Eb of the base station B is registered in the common database. Therefore, every time the mobile phone moves from one base station area into another, therefore, its location information is updated in the common database. Radio propagation ranges in the areas of two adjacent base stations (such as stations A and B, for example) usually overlap each other. In this case, however, its location information is registered to be in that area from where a stronger radio signal is transmitted. In order to detect which base station area it is in, specific data may be allocated to each base station by changing its carrier frequency a little or by applying frequency or phase modulation to the radio signal transmitted.

In the conventional mobile communications by vehicular and handy phones, it is a fundamental communication function that the location of a mobile phone is registered in the common database when the phone is switched on. In this case, however, this location information is registered every calling area (being a collection of several base station areas, as described above, and which corresponds to an area denoted as a "chome" in the address format of the Japanese administrative system). Namely, when the mobile phone is switched on, the location is registered of that calling area in which the phone is currently located, and when it moves from one calling area to another, the location is registered of this new calling area. In short, the location information in the common database is usually updated for every calling area.

According to the present invention, however, the mobile phone allows its location to be registered at every base station area, as described above. In short, its location can be updated every time it moves from one base station area to another (from the base station A to the base station B, for example).

When the mobile phone user leaves his home and is currently in the area Ea of the base station A, the mobile phone transmits his location information, which shows that he is now in the area Ea of the base station A, in response to a signal which is transmitted from the base station A which has a frequency characteristic of the station A, and his location is registered in the common database. When he moves from the station A into the area Eb of the station B, the mobile phone transmits his location information, which shows that he is now in the area Eb of the station B, in response to a signal which is transmitted from the base station B which has a frequency characteristic of the station B. His location information which has been registered in the common database is thus updated with his new location information showing that he is currently in the area Eb of the base station B. The latest location information can be registered in this manner in the common database for every base station.

When his business company or his home ask where he is currently, access is made to the common database and the current location information of the mobile phone is read, using the subscriber number of his phone as a key, and this information is sent to his business company or to his home. When a software program is prepared in such a way that when he is in the area Ea of the base station A, that area can be specified to a lot number "or No. 1, 1-chome" using the address format of the Japanese administrative system, and that when he is in the area Eb of the base station B, that area can be specified to a lot number (or No. 2, 1-chome), then more precise location information can be sent to his business company or to his home. In short, the current location of his mobile phone can be specified to a spot denoted as a lot number in the address format. Thus, the present invention can specify a location of the mobile phone within an extremely small area.

DETAILED DESCRIPTION OF PREFERRED EMBODIMENTS

The principle of the present invention will be described before various embodiments of the present invention are described in detail.

Figure 2:
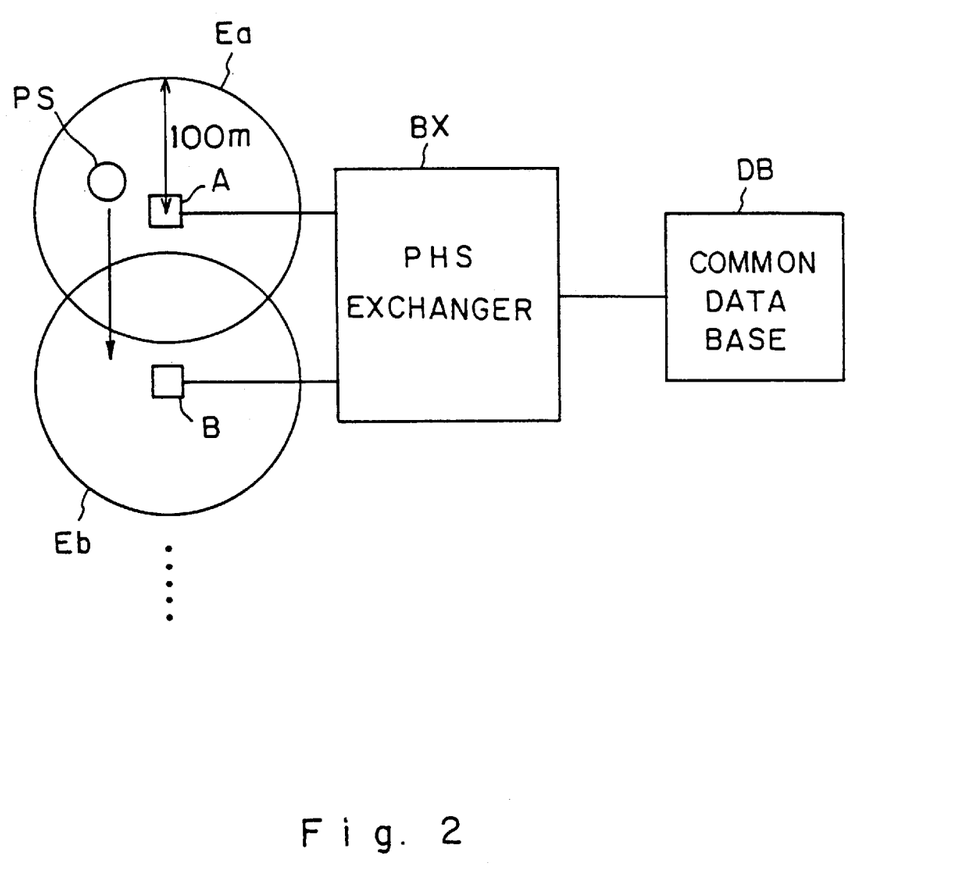
FIG. 2 is a block diagram showing the principle of the present invention.

The location-registration area in the mobile communication system into which the PHS is incorporated is characterized, as described above, in that the range in which radio signals can be propagated from a base station equals a calling area (which is about 1–2 square kms and which is denoted as a "chome") which comprises a plurality of small areas, each of which has a radius of 100 m (and which is denoted by a lot number according to the address format). According to the present invention, therefore, location data transmitted from a mobile phone PS is registered in a common database DB through a PHS exchanger BX for every 100 m-radius area Ea, Eb, or - - - of each base station A, B, or - - - , as shown in FIG. 2.

When a mobile phone PS is in the area Ea of the base station A, for example, it transmits its location information in response to a radio signal transmitted from the base station A, the signal having a frequency characteristic of the station A, and this location information is registered in the common database DB. When the mobile phone PS moves from the area Ea of the base station A into the one Eb of the base station B which is adjacent to the area Ea, it transmits its location information in response to radio signal transmitted from the base station B, the signal having a frequency characteristic of the station B, and this location information showing that it is in the area Eb of the base station B is registered in the common database DB. Every time when the mobile phone PS moves from one base station area into another, therefore, its location information is registered in the common database DB. Radio propagation ranges in the areas of two adjacent base stations (such as stations A and B, for example) usually overlap each other. In this case, however, the location information of the mobile phone PS is registered as being in that area from where a stronger radio signal is transmitted. In order to detect which base station area it is in, specific recognition data may be allocated to each base station by changing carrier frequency a little or applying frequency or phase modulation to radio wave transmitted. The calling areas may be discriminated from one another by large changes in carrier frequency.

According to the present invention, the mobile phone allows its location to be registered every base station area, as described above. In short, its location can be updated every time it moves from one base station to another (from the base station A to the base station B, for example), as shown in FIG. 2.

When the mobile phone user leaves his home and is currently in the area Ea of the base station A, the mobile phone PS transmits his location information, which shows that he is now in the area Ea of the base station A, in response to a signal which is transmitted from the base station A which has a frequency characteristic of the station A, and his location is registered in the common database DB. When he moves from the station A into the area Eb of the station B, the mobile phone transmits his location information, which shows that he is now in the area Eb of the station B, in response to a signal which is transmitted from the base station B, and which has a frequency characteristic of the station B. His location information which has been registered in the common database DB is thus updated with his new location information showing that he is currently in the area Eb of the base station B. The latest location information can be registered in this manner in the common database DB for every base station.

When his business company or his home ask where he is currently, access is made to the common database DB and the current location information of the mobile phone PS is read, using the subscriber number of his phone PS as a key, and this information is sent to his business company or to his home. When a software program is prepared in such a way that when he is in the area Ea of the base station A, that area can be specified to a lot number "or No. 1, 1-chome" using the address format of the Japanese administrative system, and that when he is in the area Eb of the base station B, that area can be specified to a lot number (or No. 2, 1-chome), then more precise location information can be sent to his business company or to his home. In short, the current location of his mobile phone can be specified to a spot denoted as a lot number in the address format.

Some embodiments of the present invention will be described in detail with reference to the accompanying drawings.

Figure 3:
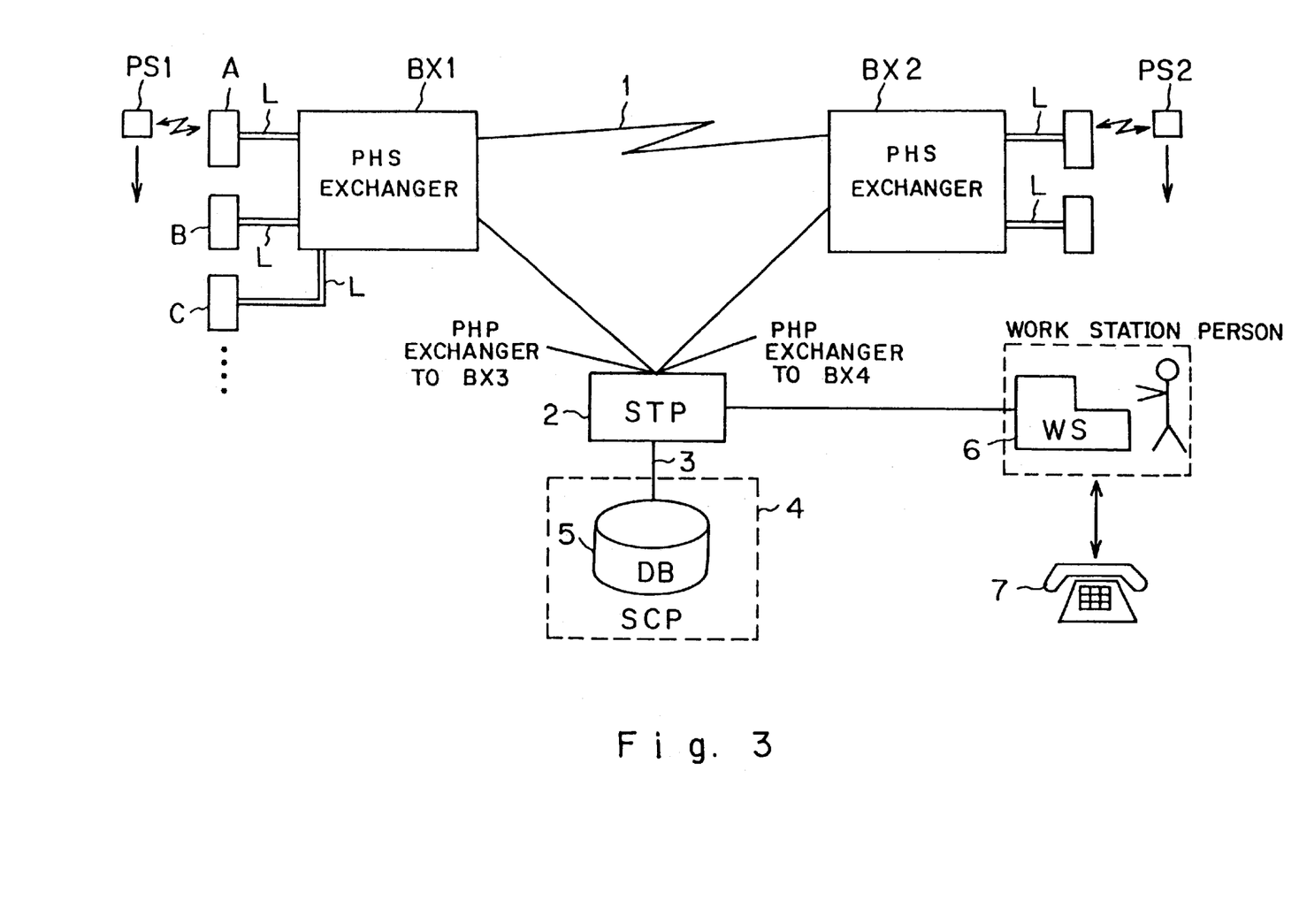
FIG. 3 is a block diagram showing an embodiment of the present invention.

FIG. 3 is a block diagram showing an embodiment of the present invention. Each of the base stations A, B, C, - - - has a radio propagation range with a radius of about or less than 100 m and they are spread over the city, for example, with their radio propagation ranges located adjacent to one another (each of them overlapping one another little).

Figure 4:
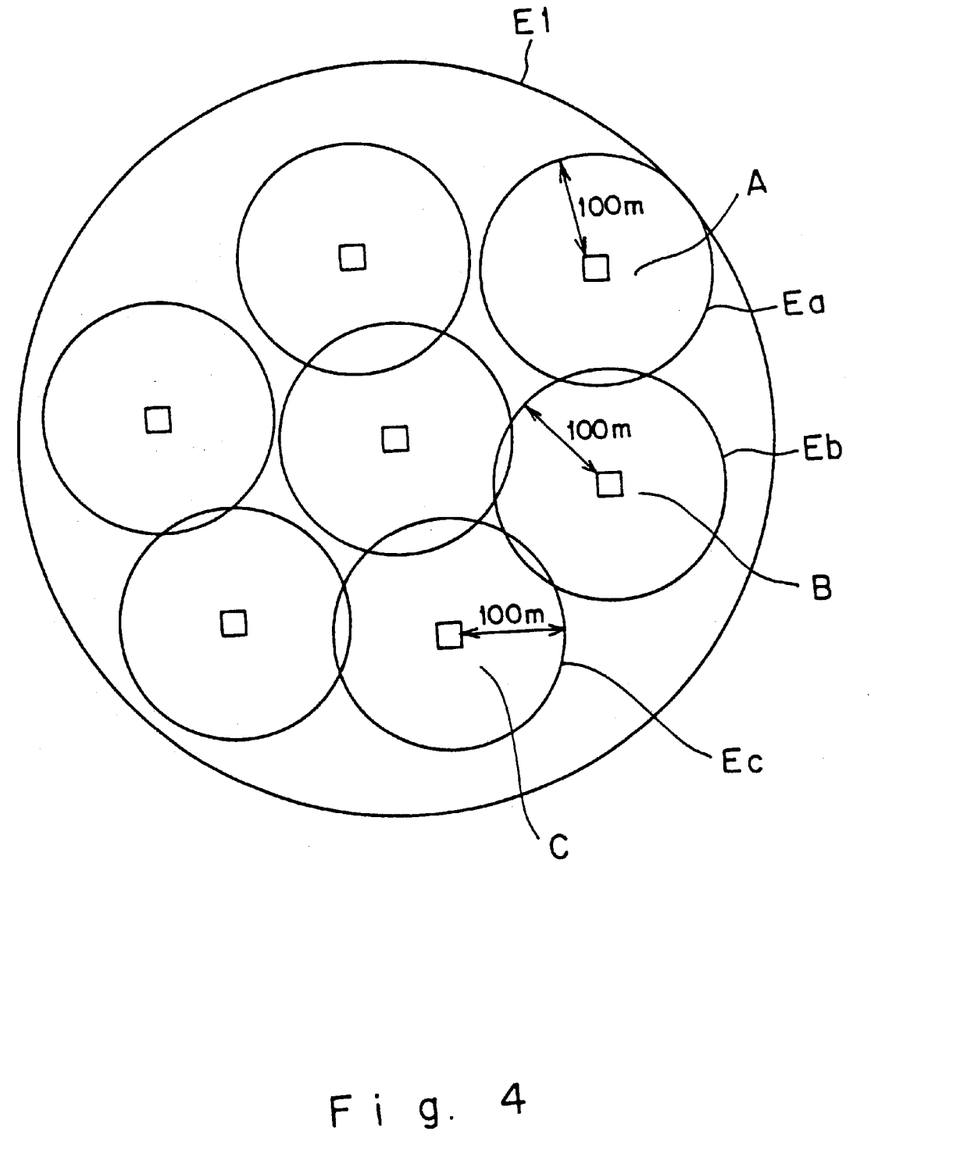
FIG. 4 shows base station areas and a calling area which comprises a plurality of these base station areas used in the embodiment of the present invention.

Each of the base stations A, B, C, - - - has its radio propagation range which is equal to an area denoted as a lot number in the address format, as described above. For example, as shown in FIG. 4, the base station A has the area Ea as its radio propagation range, which is equal to an area denoted as one lot number, and the base station B has the area Eb also denoted as one lot number. The areas of these base stations are joined up to form a calling area E1. This calling area E1 is about 1–2 square kms, which is equal to an area denoted as a "chome".

Each of the base stations A, B, C, - - - which form the calling area E1 is connected to a PHS exchanger BX1 through a transmission line L, as shown in FIG. 3. Furthermore, exchanger BX1 is connected to the corresponding PHS exchangers BX1, BX2, BX3, - - - in every calling area. These PHB exchangers BX1, BX2, BX3, - - - are connected to one another through a voice line 1. Each of them is also connected to a signal transmission point (STP) 2, which is connected to a common database (DB) 5 at a service control point (SCP) 4 through a common line 3.

Connected to the service control point 4 is a work station (WS) 6 of an enterprise which works for this service (which will be hereinafter referred to as the enterprise), and connected to this enterprise are subscribers' phones 7 in homes and in business companies.

PS1 and PS2 in FIG. 3 represent mobile phones, which can transmit and receive to and from a base station from which the strongest radio signal is received, within a range of about 100 m radius from the base station. In FIG. 3, the mobile phone PS1 is moving from the area Ea of the base station A into the area Eb of the base station B. This is shown in more detail in FIG. 5.

Figure 5:
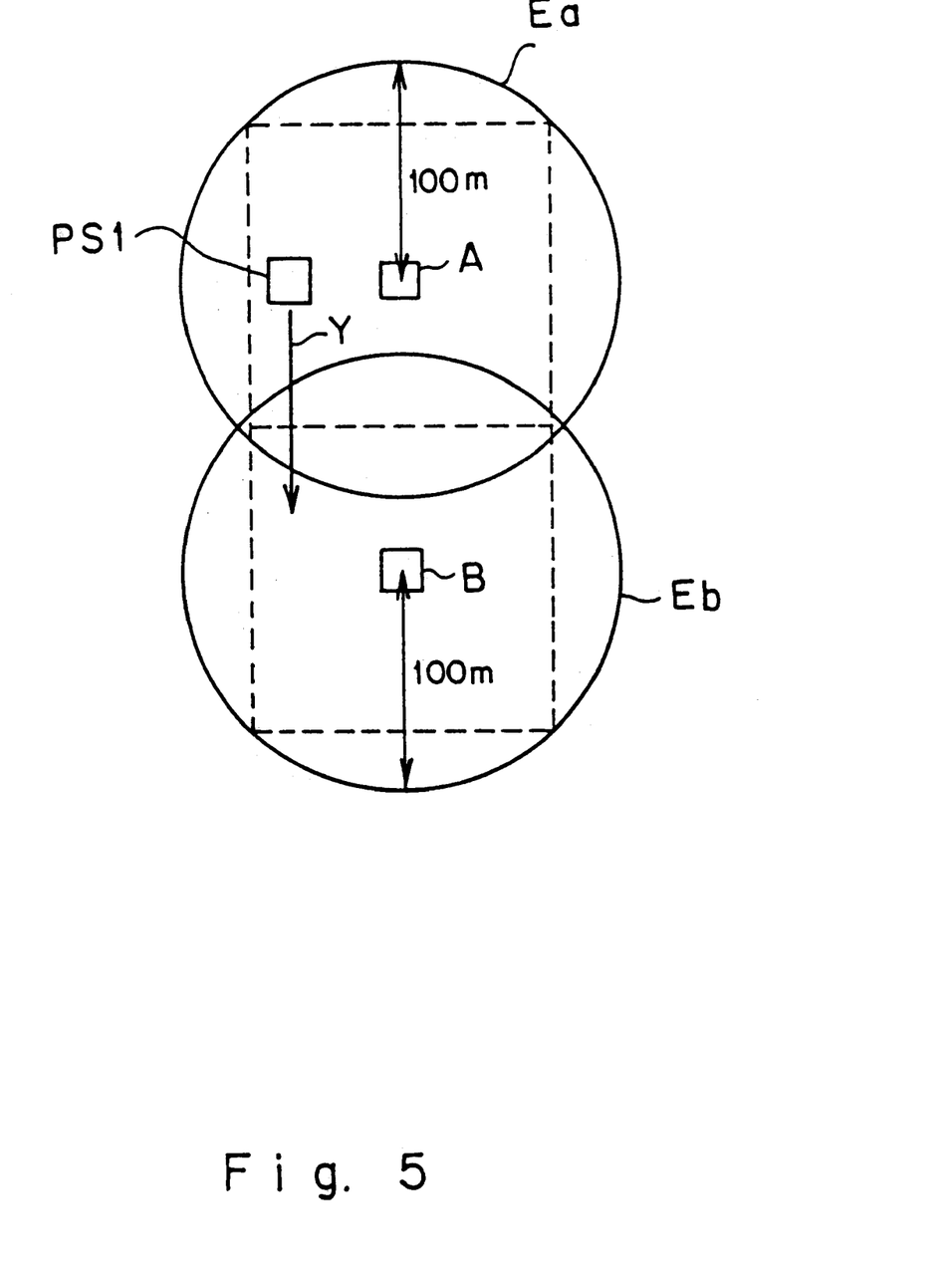
FIG. 5 shows two adjacent base station areas and a mobile phone moving from one of these base station areas to the other.

In FIG. 5, the radio propagation range (or area Ea) of the base station A, which is denoted as a circle having a radius of 100 m, is adjacent to the area Eb of the base station B, each overlapping the other a little. A rectangular area enclosed by a broken line in each of the areas Ea and Eb corresponds to that denoted as a lot number in the address format. Therefore, the area enclosed by a rectangle in the area Ea of the base station A is equal to that denoted as "No. 1, 1-chome" and the area enclosed by a rectangle in the area Eb of the base station B is equal to that denoted as "No. 2, 1-chome". In FIG. 5, therefore, the user of the mobile phone PS1 is walking in a direction shown by an arrow Y from "No. 1, 1-chome" into "No. 2, 1-chome".

Figure 6A:
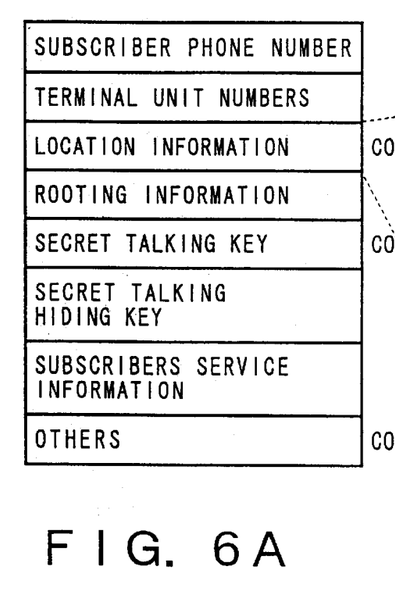
FIG. 6 shows an example of contents of a database used in the embodiment of the present invention.

Location and other routine information, secret talking keys, secret talking/hiding keys, subscribers and other information such as numbers of subscribers phones, mobile phones, exchangers and base stations, are stored in the common database 5, as shown in FIG. 6A.

Figure 6B:
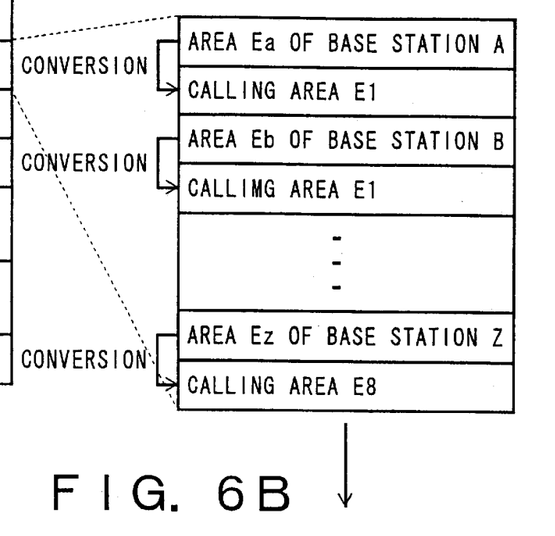

Also stored in the common database 5 is an allocation table, in which the location register information of base stations are allocated to calling areas, to thereby show which base station belongs to which calling area. More specifically, it can be understood from the allocation table that the area Ea of the base station A is in the calling area E1, and that the area Eb of the base station B is in the same calling area E1, as shown in FIG. 6B. In other words, it can be determined that the mobile phone PS1 is in the calling area E1 when it is in the area Ea of the base station A, and that it is in the same calling area E1 when location information is received saying that it has moved from the base station A into the base station B. This decision can be made by converting the above location information into the calling area information, when transmission is received saying that the mobile phone PS1 has moved from the base station A into the base station area Eb.

In the personal communication service system, it is one of the original functions, as described above, that location information is registered in every calling area. According to the present invention, however, it is registered in every base station. When it is decided that the mobile phone has moved from one of the base stations to another, but that no change is made of the location register relating to the calling area in which the mobile phone is currently located, therefore, the location register in the calling area is not updated. It is only updated when the calling area in which the mobile phone is currently located, has changed.

Figure 6C:
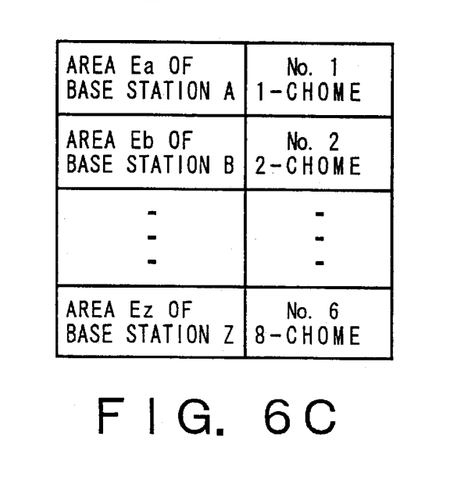

Further, a table is prepared showing where the area of each of the base stations is located, in which geographical position in the city. More specifically, the location information of each base station area is set to correspond to a geographical place name or a "lot number, chome" in the city, in such a way that the base station area Ea corresponds to "No. 1, 1-chome" and that the base station area Eb corresponds to "No. 2, 1-chome", as shown in FIG. 6C.

Figure 7:
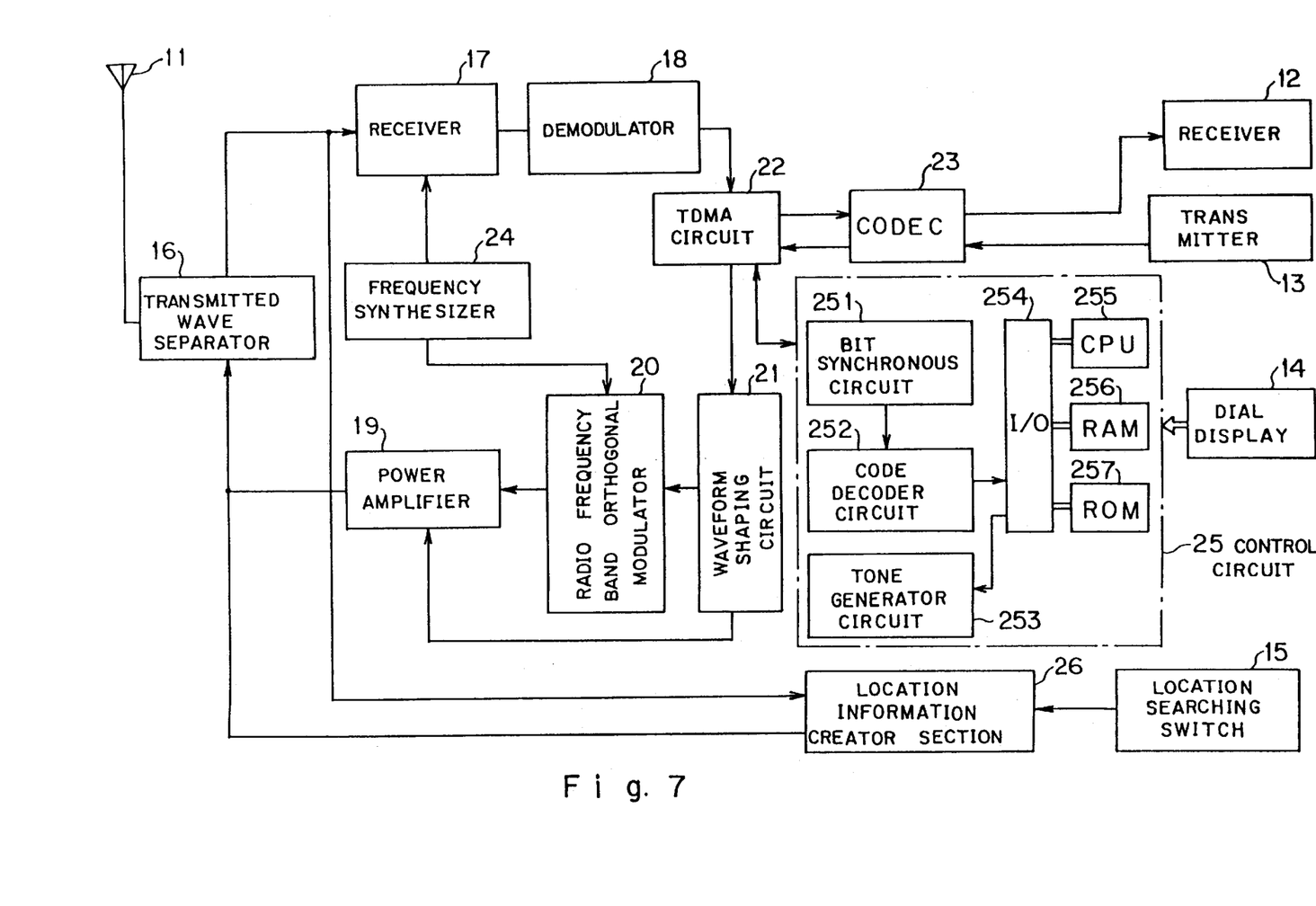
FIG. 7 is a block diagram showing an arrangement of the mobile phone.

FIG. 7 is a block diagram showing how each of the mobile phones PS1, PS2, - - - is arranged (the mobile phone PS1 will be described below, but the arrangement of each of the others is same as that of the mobile phone PS1). The mobile phone PS1 includes, as its external components, an antenna 11, a receiver 12, a transmitter 13, a dial display 14, a location searching switch 15, and other switches. As its internal components, it includes a received and transmitted wave separator 16 connected to the antenna 11, a receiver 17 connected to the wave separator 16 to form a reception circuit, a demodulator 18, a power amplifier 19 to form a transmission circuit, a radio frequency band orthogonal modulator 20 and a waveform shaping circuit 21. Further, it includes a TDMA circuit 22 and a CODEC (coder-decoder)

23 connected between the transmission and reception circuits receiver 12 and transmitter 13, a frequency synthesizer 24 connected to the receiver 17 and the radio frequency band orthogonal modulator 20, and a control circuit 25 connected to the TDMA circuit 22. The control circuit 25 comprises a bit synchronous circuit 251, a code decoder circuit 252, a tone generator circuit 253, an input and output circuit 254, a CPU 255, a RAM 256, and a ROM 257.

The above-mentioned internal components are common to the standard PHS mobile phone. In the present invention, however, a location information creator section 26 is further provided in every mobile phone. The location information creator section 26 is made operative when the location searching switch 15 is switched on. Therefore the location searching switch 15 can be switched either on or off by the user. In short, the user may sometimes want that his location is not registered. He may turn the switch 15 off in this case.

When the user leaves his home with the mobile phone PS1 and with the location searching switch 15 switched on, the location information creator section 26 receives a signal from the nearest base station (base station A, for example) through the antenna 11 and the wave separator 16, the signal having a frequency characteristic of the base station A in this case, creates location information which shows that he is in the area of the base station A, and transmits it from the antenna 11 through the wave separator 16. It is received at the nearest base station A and sent from the PHS exchanger BX1 to the common database 5 of the service control point 4 through the signal transmission point 2. The users location is thus registered in the common database 5.

From the allocation table in which the location information of each of the base stations is allocated to each of the calling areas, as shown in FIG. 6B, it is decided at this time which calling area that the location information currently registered corresponds to, by comparing it to the location information for all the calling areas. If the location information sent from the mobile phone shows that it is in the area of the base station A, for example, it will be decided that the calling area in which the mobile phone is currently located is E1. If the calling area previously registered is the same as that currently registered, the calling area will not be updated, but if it is not same, it will be updated.

It will be described how the system having the above-described arrangement is operated. The location searching switch 15 is switched on in this case.

The user is walking with the mobile phone PS1 in the area of the base station A (the mobile phone PS1 is switched on in this case). A signal having a frequency which is characteristic of the base station A, is transmitted from the base station A and when it is received by the mobile phone PS1, the location information creator section 26 is made operative to create the location register information.

Figure 8:
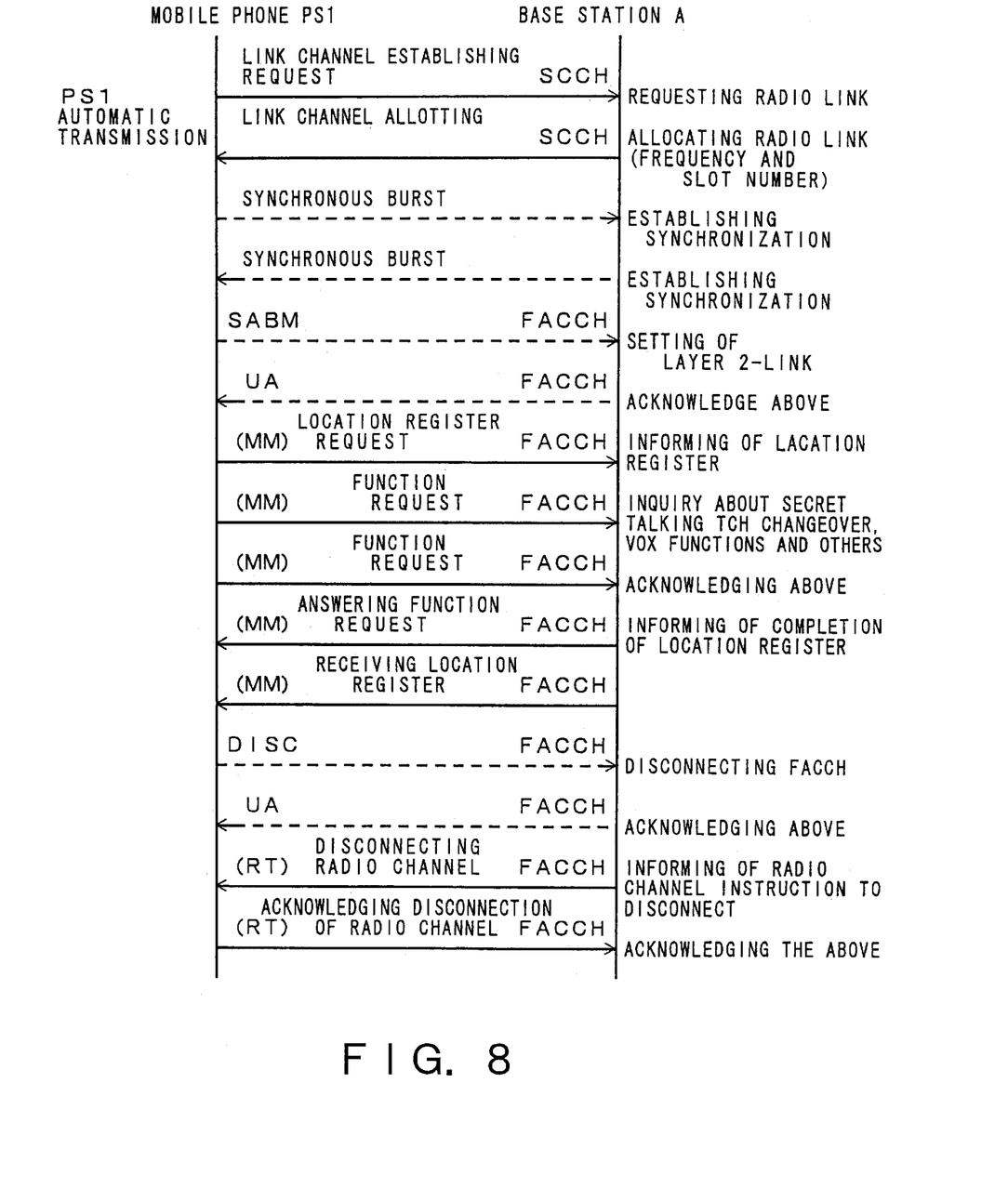
FIG. 8 shows an operation sequence between the mobile phone and a base station.

FIG. 8 is a diagram showing the sequence of how a signal is transmitted and received between the base station A and the mobile phone PS1, when the mobile phone PS1 is set to register its location. When a link channel establishing request (or radio link request) is transmitted from the mobile phone PS1, a link channel allotting signal is transmitted from the base station A to allot a radio link (or frequency and slot number). An SCCH (signaling control channel) used to carry out the link channel establishing and channel allotting requests, is of the two-way type through which the information needed for connection control and control information are transferred, (except for call-up). A synchronous burst signal is transmitted from the mobile phone PS1 and then from the base station A. Synchronization is thus established.

SABM (set asynchronous balanced mode) is then transmitted from the mobile phone PS1 to thereby set layer 2-link. In response to this, UA (unnumbered acknowledgement) is transmitted from the base station A to acknowledge the setting of the layer 2-link. A location register request (or information for the location register), and then a function request signal are transmitted from the mobile phone PS1. The function request in this case relates to secret talking/hiding, TCH changeover, VOX functions and others. A function request signal (to acknowledge the above function request already transmitted) is then transmitted from the mobile phone PS1. The answer relative to the function request and then location register reception (or information for location register completed) are transmitted from the base station A. DISC (disconnect) is transmitted from the mobile phone PS1 with UA (unnumbered acknowledgement) from the base station A. Thereafter, a radio channel disconnect signal is transmitted from the base station A to inform about the disconnection of the radio channel, with a radio channel disconnect acknowledgement signal from the mobile phone PS1.

An FACCH (fast associated control channel) used after the SABM is intended to transfer control information at a high speed to shorten interruption time in a case where it is needed that the transfer of user information is temporarily interrupted to transfer control information. In FIG. 8, MM (mobility management) attached to that part of the sequence which starts from asking the location register and ends with completing it, is intended to manage the mobility of the moving phone, and RT (radio transmission) attached to another part of the sequence which starts from disconnecting the radio channel and ends with acknowledging the radio channel disconnection, is intended to manage radio resources.

The above-described sequence is in operation at all times when the mobile phone PS1 is switched on, and it is automatically determined which base station area the mobile phone PS1 is currently in, to thereby transmit a location register request as required.

Figure 9:
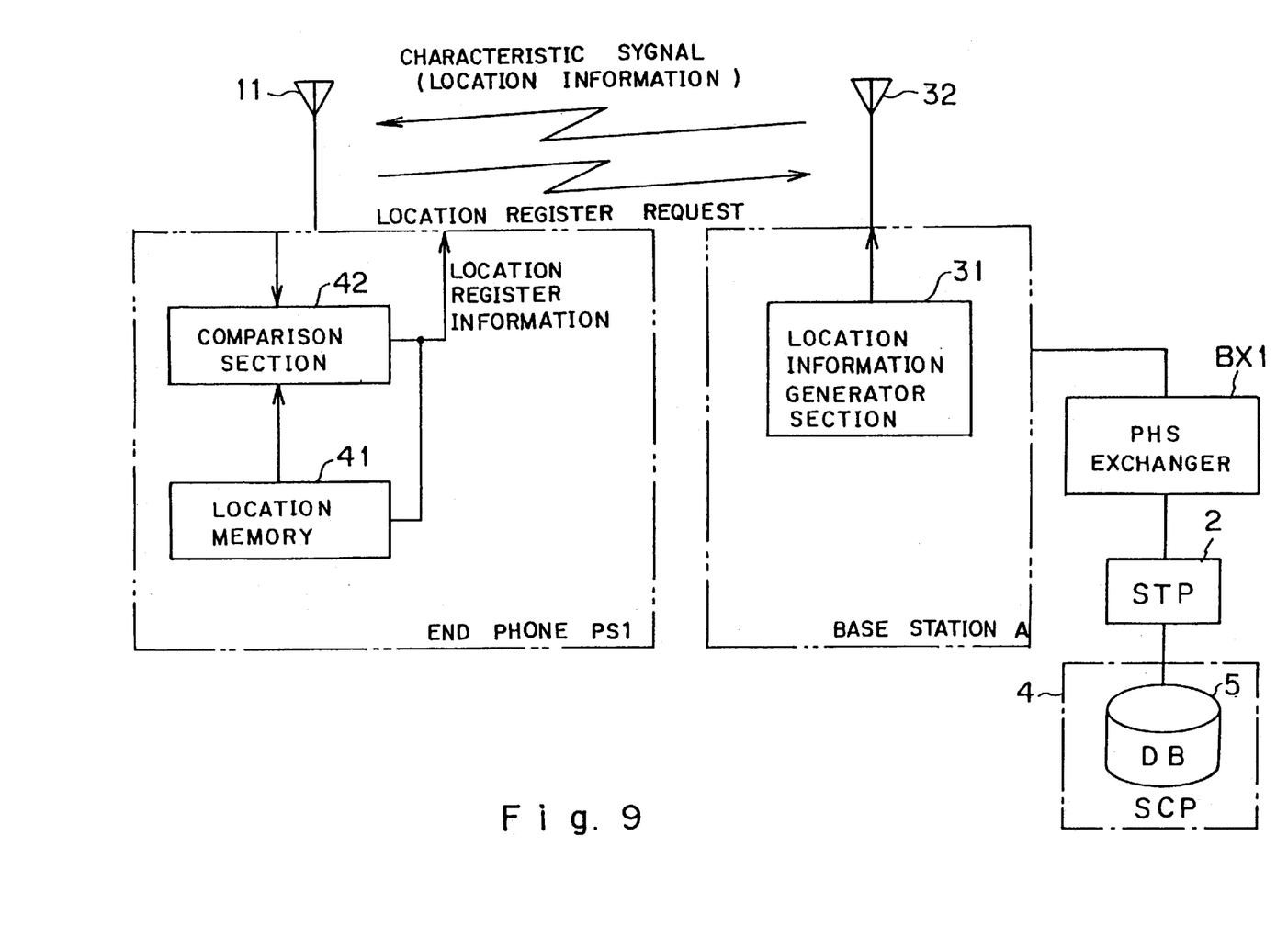
FIG. 9 shows how the location information is created and how it is registered.

The location register procedure in the above-described sequence is carried out as shown in FIG. 9. A location information generator section 31 is included in each of the base stations (base station A in this case) to generate a signal (or location information) which is characteristic of the base station A and which shows the position of it, and this characteristic signal or location information is transmitted in the area Ea of the base station A through an antenna 32. On the other hand, a memory (or location memory) 41, in which the location information of the base station last received is stored, and a comparison section 42, in which location information from the base station now received is compared with that stored in the memory 41, are both included in the location information creator section 26 of each of the mobile phones (mobile phone PS1 in this case).

When the mobile phone PS1 receives the characteristic signal or location information from the base station A through the antenna 11, this location information received through the antenna 11 is compared with that in the memory 41 by the comparison section 42. When the location information just received is not the same as that in the memory 41, it is stored, as new location information in the memory 41, and transmitted as location register information. This location register information transmitted from the mobile phone PS1 is received by the base station A and sent to the PHS exchanger BX1. It is then sent from the exchanger BX1 to the service control point 4 through the signal transmission point 2, and registered in the common database 5.

Figure 10:
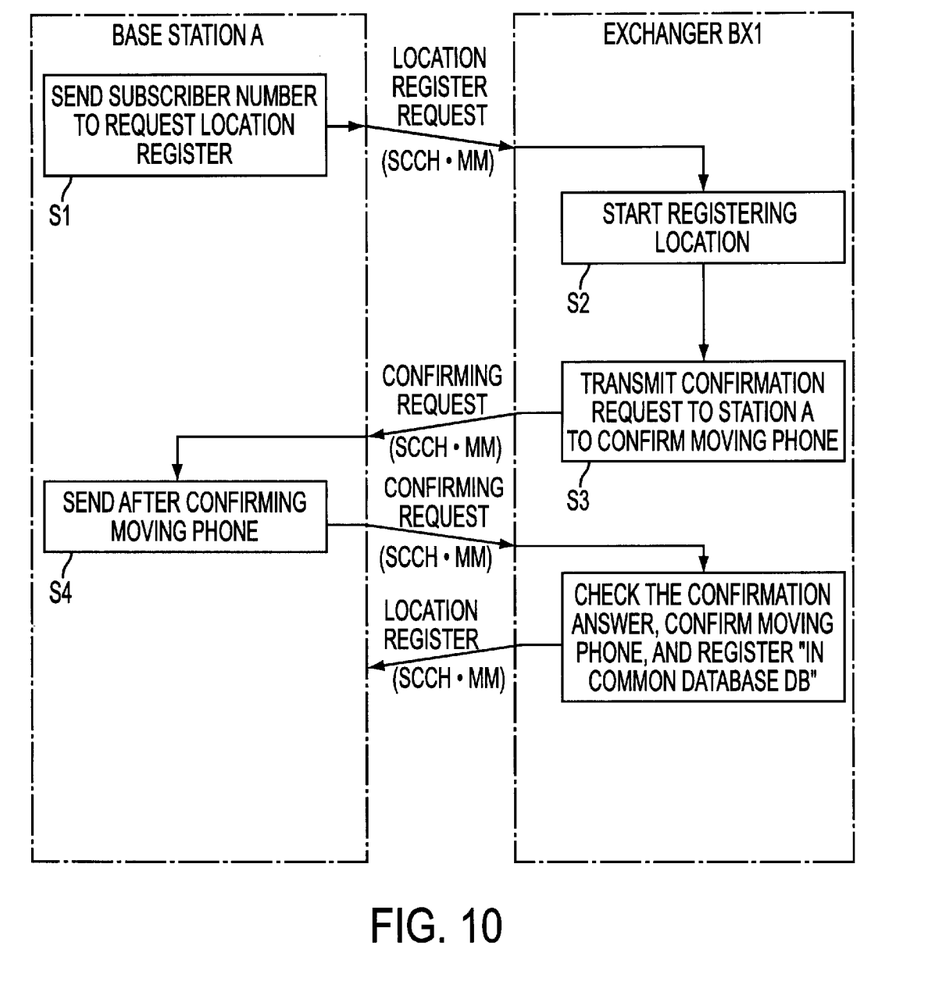
FIG. 10 shows a signal receiving sequence between the base station and an exchanger.

FIG. 10 is a sequence diagram showing the sequence of how a signal is transmitted and received between the base station A and the PHS exchanger BX1 during the above-described location register operation.

The base station A asks for location registration to the PHS exchanger BX1, and sends a subscriber's number to it (step S1). In response to the location register request received, exchanger BX1 starts processing the location register (step S2) and transmits a confirmation request to the station A to confirm the phone is moving (step S3). When the confirmation request is received, the base station A confirms the phone is moving and sends a confirmation answer to the exchanger BX1 (step S4). When the exchanger BX1 checks the confirmation answer and confirms the phone is moving, the location information transmitted from the mobile phone is registered in the common database DB (step S5).

From the allocation table in which the location information of each of the base stations is allocated to each of the calling areas, it is decided by the above-described location register process that the location information registered at that time corresponds to the calling area, by comparing it to that for other calling areas. This location register for each of the calling areas is made when the mobile phone is switched on or when it moves in to a new calling area. If the mobile phone is switched on in the area of the base station A, information that the mobile phone PS1 is in the area of the base station A is sent from the station A, and in response to this information, it is decided from the allocation table that the calling area in which the mobile phone is located is E1. The location register of the calling area E1 is thus updated.

When the user moves from the area of the base station A into that of the base station B with the mobile phone PS1, a signal having a frequency characteristic of the base station B is transmitted from the base station B. Therefore, the mobile phone PS1 transmits location register information which indicates that it is in the area of the base station B, and this information is sent to the service control point 4. The location information last registered in the common database is thus updated and the location register information which indicates that the mobile phone PS1 is in the area of the base station B is registered in the common database, accordingly.

In the same manner as described above, it is determined from the allocation table that the base station whose location register information is currently registered is located in which calling area, by comparing the location register information to that of all other calling areas. In this case, the mobile phone PS1 transmits information which indicates that it is in the area of the base station B. In response to this information, however, it is decided from the allocation table that the calling area in which it is located is E1, and that the calling area is the same as before. Accordingly, the calling area is not updated in this case. When the user subsequently moves into another calling area (calling area E2) with the mobile phone PS1, location register information which shows that the user or the mobile phone is in the area of a base station which belongs to the calling area E2 is generated and subsequently registered. In this case, it is determined from the allocation table that the calling area to which the mobile phone PS1 belongs is E2 and that it is not the same as before. The location register information of calling area is thus updated.

When a person at home, or the like (who will be hereinafter referred to as the investigator) wants to know where the user or the mobile phone is located, he asks this of an operator at the work station over a telephone 7. More specifically, he asks the work station operator "where is 111-2222?" if the subscriber's number of the mobile phone PS1 is 111-2222, in this case.

The work station operator then gains access to the service control point 4 through an information processing terminal or work station 6. This access is gained by inputting "111-2222" into the work station 6. Using "111-2222" as a key, the service control point 4 reads the location information currently registered for the mobile phone PS1 from the common database 5. The location register information for the mobile phone PS1 currently registered in the common database, in this case, provides the location register information of the area of the base station B. Therefore, actual address information "No. 2, 1-chome" is sent to the work station 6 based on the allocation table between the location register information of the area of the base station B and the actual address information, in accordance with the allocation table shown in FIG. 6C. It is thus printed out by a printer or displayed on a display screen such as a CRT, that the mobile phone having the subscriber's number of "111-2222" is currently located at No. 2, 1-chome, in a certain area of the city. The work station operator, therefore, is able to answer the investigator over the telephone that "111-2222 is currently located at No. 2, 1-chome, in a certain area of the city.

The current position of the user who leaves his home or business company with the mobile phone, can be more easily specified in this manner to the home or business company, over the telephone.

Figure 11:
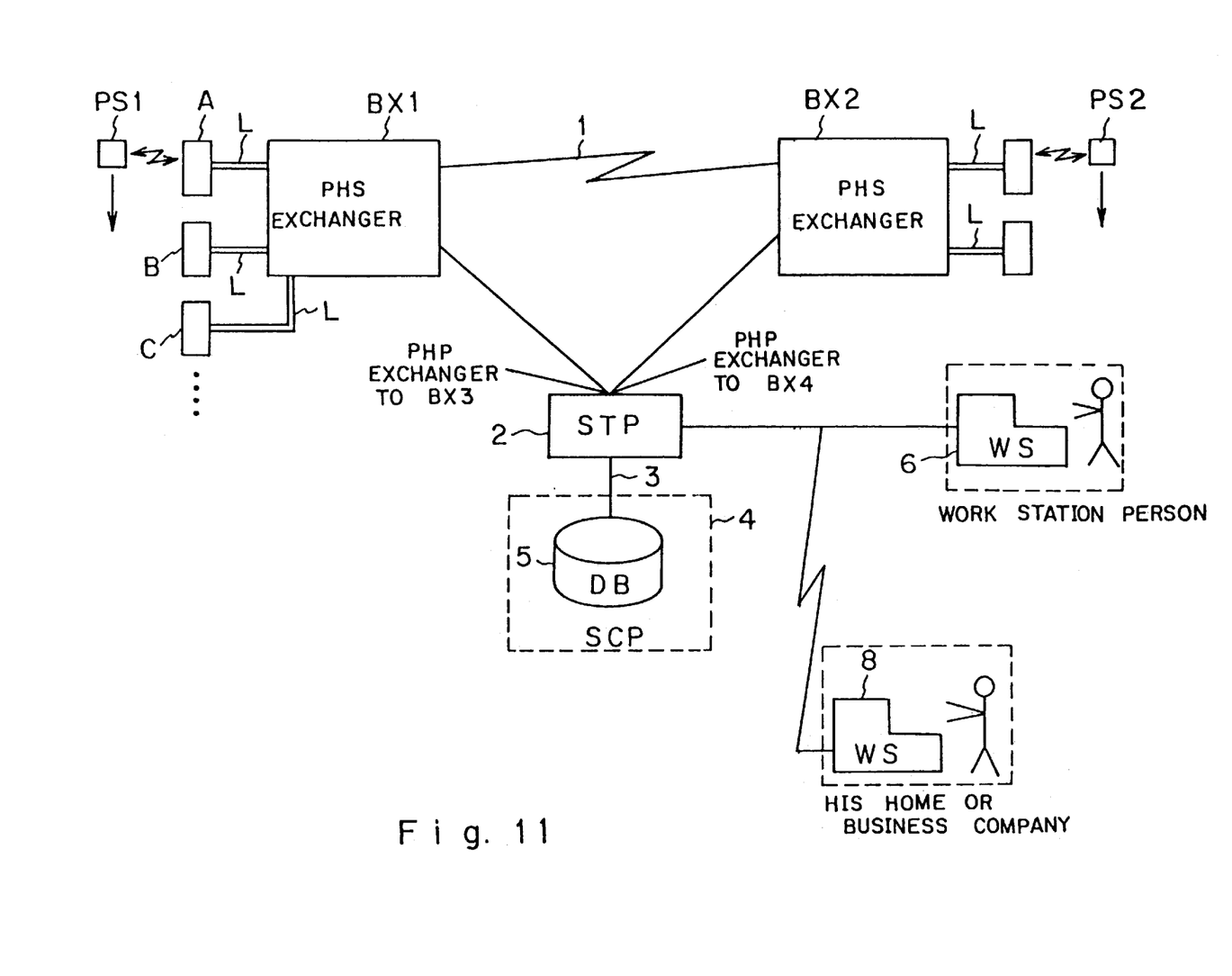
FIG. 11 is a block diagram showing another embodiment of the present invention.

Although the investigator has asked the work service operator about the current position of the mobile phone, over the telephone in the above-described embodiment, the present invention may further be embodied as shown in FIG. 11. In the case of this further embodiment shown in FIG. 11, a remote work station 8, which serves as the information processing terminal, is installed in a home or a work room of a business company, and access is gained directly to the service control point 4 from homes or business companies by operation of the work station 8. The work station 8 through which the access is gained, receives the requested information from the service control point 4, and this information is printed out by a printer or displayed on a display screen, as seen in the above-described case. This makes it possible to more quickly obtain the location information when the current location of the mobile phone PS is requested.

A location searching service fee may be charged for every location search according to the time for which the search lasts, or it may be charged in the form of a lump-sum payment.

According to the present invention as described above, the location of a mobile phone is automatically registered within an extremely small area which is equal to that denoted by a lot number in the address format, and also to a radio propagation range covered by a base station, while using the location register function of the mobile phone in the personal handy phone system. When the location of a user who leaves home with the mobile phone, is requested by an investigator, therefore, the current location of the user or the mobile phone can be specified within an extremely small area. This enables the current location of an old person or a young boy or girl who leaves home with the mobile phone for some activity in the evening, for example, to be easily achieved from home. The system is therefore quite useful in daily life and also enables a more useful location searching service for the mobile phone to be realized in the business field.

What is claimed is:

1. A method for a wireless communications system having a plurality of base station areas wherein a wireless communications terminal may move between the plurality of base station areas, comprising:

receiving, by the wireless communications terminal, a signal from at least one base station out of said plurality of base stations, the signal having a frequency characteristic identifying the base station area;

determining, by the wireless communications terminal, a base station area out of the plurality of base station areas which the wireless communication terminal is located according to the received signal, comparing, by the wireless communications terminal, the received signal and a signal previously received stored in a memory to determine if the wireless communication terminal has moved to a new base station area;

generating, by the wireless communications terminal, an area register information designating the determined base station area as a position of the wireless communications terminal if the result of the comparison yields that the wireless communication terminal has moved to a new base station area, transmitting, by the wireless communications terminal, the generated area register information to the base station, transferring, by the base station, the area register information received from the wireless communications terminal to a register unit, storing, by the register unit, the area register information at the register unit, recognizing the wireless communications terminal upon receiving a request for providing position information of the wireless communications terminal, selecting the area register information which is related to the recognized wireless communications terminal from said stored area register information and converting said selected area register information related to the recognized wireless communications terminal into the position information and outputting the position information for said recognized wireless communications terminal, wherein the area register information of a plurality of wireless communications terminals is stored with identification information of each wireless communications terminal by the register unit, and the selection of the area register information which is related to the recognized wireless communications terminal is performed by retrieving the area register information from the register unit using the identification information of the wireless communications terminal as a search key.

2. The method of claim 1 further comprising:

updating said area register information for each wireless communications terminal of a plurality of wireless communications terminals by performing a predetermined communication between said wireless communications terminal and a base station provided in a base station area.

3. The method according to claim 2 wherein the predetermined communication comprises:

allocating, by the base station whose base station area the wireless communications terminal is located in, a radio link channel to the wireless communications terminal;

establishing synchronization between the wireless communications terminal and the base station; and setting a layer 2-link between the wireless communications terminal and the base station.

4. The method of claim 1 further comprising:

storing geographical name information corresponding to an base station area of the plurality of base station areas, and outputting the geographical name information corresponding to the position of said wireless communications terminal.

5. The method of claim 1 wherein step further comprises:

storing information designating a calling area of said wireless communications terminal in storing area register information.

6. The method according to claim 5 wherein the plurality of base station areas composes the calling area, and further comprising:

determining whether or not the calling area to which the base station area designated by the area register information belongs to is the same calling area designated by the stored information when the area register information is updated; and updating the information designating the calling area according to the determination.

7. The method according to claim 5, further comprising:

transmitting, by the base station, the area register information and the identification information to an exchanger corresponding to a calling area which the base station belongs to;

confirming the identity, by the exchanger, of the wireless communications terminal using the identification information;

transmitting, by the exchanger, the area register information to the register unit;

determining, by the register unit, whether or not the calling area which the wireless communications terminal is previously registered in is the same calling area which the base station belongs to when the area register information is updated; and updating, by the register unit, the calling area which the wireless communications terminal is registered in according to the determination.

8. A method for a wireless communications system having a plurality of base station areas, wherein a wireless communications terminal may move between the plurality of base station areas, comprising:

receiving, by the wireless communications terminal, a signal from at least one base station out of said plurality of base stations, the signal having a frequency characteristic identifying the base station area;

determining, by the wireless communications terminal, a base station area out of the plurality of base station areas which the wireless is located according to the received signal, comparing, by the wireless communications terminal, the received signal and a signal previously received stored in a memory to determine if the wireless communication terminal has moved to a new base station area;

generating, by the wireless communications terminal, a location information designating the determined base station area as a position of the wireless communications terminal if the result of the comparison yields that the wireless communication terminal has moved to a new base station area, transmitting, by the wireless communications terminal, the generated location information to the base station, transferring, by the base station, the location information received from the wireless communications terminal to a register unit, storing, by the register unit, the location information at the register unit, recognizing said wireless communications terminal upon receiving a request for providing position information of said wireless communications terminal, determining position information of said wireless communications terminal by associating said position information with said location information, and storing said position information of said wireless communications terminal and outputting the position information for said wireless communications terminal, wherein the area register information of a plurality of wireless communications terminals is stored with identification information of each wireless communications terminal by the register unit, and the area register information which is related to the recognized wireless communications terminal is retrieved from the register unit using the identification information of the wireless communications terminal as a search key.

9. The method of claim 8 further comprising:

updating said position information for said wireless communication terminal by performing a predetermined communication between said wireless communications terminal and a base station provided in the base station area, and outputting the updated position information as current position information for said wireless communications terminal.

10. The method of claim 9, wherein said wireless communications terminal provides new information as it moves from one base station area to another.

11. The method of claim 8 further comprising:

allocating a base station to a calling area from a plurality of calling areas, storing an allocation table showing which base station belongs to which calling area, and determining which calling area said wireless communications terminal is located in by relating said allocation information to said positioning information.

12. The method of claim 8 wherein:

said position information further includes routine information including subscriber phone numbers and subscriber service information.

13. A system for providing a location of an apparatus in which said apparatus moves from one calling area into another, said calling area comprising a plurality of base station areas, each of which is provided within a radio propagation range from a base station, said base station being arranged in said radio propagation range, the system comprising:

said apparatus including;

a signal receiving unit receiving a signal from at least one base station out of said plurality of base stations, the signal having a frequency characteristic identifying the base station area;

a memory to store a signal previously received;

a comparing unit comparing the received signal and the signal stored in the memory to determine if the wireless communication terminal has moved to a new base station area;

a location register information generating unit generating a location register information representing that said apparatus is in an area of the base station whose signal is received if the result of the comparison by the comparing unit yields that the wireless communication terminal has moved to a new base station area; and a location register information transmitting unit transmitting the location register information to a base station which transmits the signal with the highest intensity;

each of said base stations including:

a signal generating unit generating the signal, which represents the location of the base station, and transmitting the signal; and a location register information receiving unit receiving the location register information, registering said apparatus to the base station and transferring the location register information to a registering unit;

wherein said registering unit comprises a common database; and a unit registering the location register information from each of the base stations in the common database, said common database stores the location register information of the plurality of the wireless communications terminals with identification information of the plurality of the wireless communications terminals, and when a request for providing position information of a wireless communications terminal in the plurality of the communications terminals is received, the registering unit retrieves the location register information which is related to the wireless communications terminal whose position information is requested from said common database using the identification information of the wireless communications terminal as a search key, converts the retrieved location register information to the position information and outputs the position information to a source which sent the request.

14. An apparatus for use in a system for providing a location of said apparatus in which said apparatus moves from one calling area into another, said calling area comprising a plurality of base station areas, each of which is provided within a radio propagation range from a base station, said base station being arranged in said radio propagation range, comprising:

a signal receiving unit receiving at least one signal transmitted from each base station, the signal having a frequency characteristic identifying the base station area;

a memory to store a signal previously received;

a comparing unit comparing the received signal and the signal stored in the memory to determine if a wireless communication terminal has moved to a new base station area;

a location register information generating unit generating location register information representing that said apparatus is in the area of the base station if the result of the comparison by the comparing unit yields that the wireless communication terminal has moved to a new base station area; and a location register information transmitting unit transmitting the location register information.

* * * * *